(12) United States Patent
Sun et al.

(10) Patent No.: US 11,339,282 B2
(45) Date of Patent: May 24, 2022

(54) FLOODING COMPOSITION WITH POLYTETRAFLUOROETHYENE

(71) Applicant: Dow Global Technologies LLC, Midland, MI (US)

(72) Inventors: Gangwei Sun, Shanghai (CN); Peng Gao, Shanghai (CN); Mohamed Esseghir, Lawrenceville, NJ (US)

(73) Assignee: Dow Global Technologies LLC, Midland, MI (US)

( * ) Notice: Subject to any disclaimer, the term of this patent is extended or adjusted under 35 U.S.C. 154(b) by 11 days.

(21) Appl. No.: 17/259,267

(22) PCT Filed: Jul. 11, 2018

(86) PCT No.: PCT/CN2018/095227
§ 371 (c)(1),
(2) Date: Jan. 11, 2021

(87) PCT Pub. No.: WO2020/010537
PCT Pub. Date: Jan. 16, 2020

(65) Prior Publication Data
US 2021/0277223 A1  Sep. 9, 2021

(51) Int. Cl.
*G02B 6/44* (2006.01)
*C08L 53/00* (2006.01)

(52) U.S. Cl.
CPC .............. *C08L 53/00* (2013.01); *G02B 6/443* (2013.01); *G02B 6/4494* (2013.01); *G02B 6/4413* (2013.01); *G02B 6/4434* (2013.01)

(58) Field of Classification Search
CPC .................................................. G02B 6/4494
See application file for complete search history.

(56) References Cited

U.S. PATENT DOCUMENTS

| | | |
|---|---|---|
| 4,190,570 A | 2/1980 | Kaufman et al. |
| 4,798,853 A | 1/1989 | Handlin, Jr. |
| 5,050,959 A | 9/1991 | Randisi |
| 5,187,763 A | 2/1993 | Tu |
| 5,246,783 A | 9/1993 | Spenadel et al. |
| 6,160,939 A | 12/2000 | Sheu |
| 6,496,629 B2 | 12/2002 | Ma et al. |
| 6,714,707 B2 | 3/2004 | Rossi et al. |
| 7,536,071 B2 | 5/2009 | Pavan et al. |
| 7,625,974 B2 | 12/2009 | Jozokos et al. |
| 7,995,886 B2 | 8/2011 | Pizzorno et al. |
| 10,712,522 B2 * | 7/2020 | Esseghir .................. H01B 3/22 |

FOREIGN PATENT DOCUMENTS

| | | | |
|---|---|---|---|
| EP | 0969301 A2 | 1/2000 | |
| WO | 199305113 | 3/1993 | |
| WO | 2006034723 | 4/2006 | |
| WO | 2016065497 | 5/2016 | |
| WO | WO-2016160316 A1 * | 10/2016 | .......... C08L 23/0815 |

* cited by examiner

*Primary Examiner* — Charlie Y Peng (57) ABSTRACT

Provided is a flooding composition. The flooding composition includes in weight percent (wt %) based on the weight of the composition: (A) from 1 wt % to less than 5 wt % of a polytetrafluoroethylene (PTFE) powder; (B) a styrene-ethylene/propylene block copolymer; and (C) a mineral oil having a kinematic viscosity from 32 cSt to 100 cSt at 40° C. Also a fiber optic cable is provided. The fiber optic cable includes a buffer tube; at least one optical fiber in the buffer tube; and the flooding composition.

10 Claims, 1 Drawing Sheet

FLOODING COMPOSITION WITH POLYTETRAFLUOROETHYENE

BACKGROUND

Flooding compositions are materials designed to occupy void spaces in telecommunication cables, such as the void spaces typically found around and between buffer tubes commonly used in fiber optic cables. Additionally, flooding compositions can be used as filling materials to suspend and protect optical fibers inside buffer tubes. Flooding compositions are free-flowing at elevated temperatures (such as those temperatures used when filling a telecommunication cable), and readily gel at lower temperatures to avoid dripping at room temperature. Additionally, easy-to-clean and non-messy flooding compositions are desirable for ease of installation and prevention of environmental contamination. Although advances have been made in the art of flooding compounds, improvements are still desired.

Another important property of a flooding composition is its high shear rate viscosity for ease of loading the flooding composition into buffer tubes. Current commercial flooding compounds are based on low viscosity hydrocarbons; they are messy, grease/wax-like materials that stick to surfaces that come in contact with them. In case of a spill, they are not environmentally friendly. The wire and cable industry has a continuing interest in flooding compositions that exhibit reduced stickiness, reduced absorption into materials used in the manufacture of cable components such as buffer tubes, jackets, etc., improved ease of production, and more environmental friendly.

SUMMARY

The present disclosure provides a flooding composition. The flooding composition includes in weight percent (wt %) based on the weight of the composition:
  (A) from 1 wt % to less than 5 wt % of a polytetrafluoroethylene (PTFE) powder;
  (B) a styrene-ethylene/propylene block copolymer; and
  (C) a mineral oil having a kinematic viscosity from 32 cSt to 100 cSt at 40° C.

The present disclosure also provides a fiber optic cable. The fiber optic cable includes:
  a buffer tube;
  at least one optical fiber in the buffer tube; and
  a flooding composition containing in weight percent (wt %) based on the weight of the composition
  (A) from 1 wt % to less than 5 wt % of a polytetrafluoroethylene (PTFE) powder;
  (B) a styrene-ethylene/propylene block copolymer; and
  (C) a mineral oil having a kinematic viscosity from 32 cSt to 100 cSt at 40° C.

DEFINITIONS

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., a range from 1, or 2, or 3 to 5, or 6, or 7), any subrange between any two explicit values is included (e.g., the range 1-7 above includes subranges 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

An "agglomerate" is a plurality of individual solid particles clumped or otherwise together forming a single mass.

"Alpha-olefin," "α-olefin" and like terms refer to a hydrocarbon molecule or a substituted hydrocarbon molecule (i.e., a hydrocarbon molecule comprising one or more atoms other than hydrogen and carbon, e.g., halogen, oxygen, nitrogen, etc.), the hydrocarbon molecule comprising (i) only one ethylenic unsaturation, this unsaturation located between the first and second carbon atoms, and (ii) at least 2 carbon atoms, preferably of 3 to 20 carbon atoms, in some cases preferably of 4 to 10 carbon atoms and in other cases preferably of 4 to 8 carbon atoms. Nonlimiting examples of α-olefins include ethylene, propylene, 1-butene, 1-pentene, 1-hexene, 1-octene, 1-dodecene, and mixtures of two or more of these monomers.

"Blend," "polymer blend" and like terms refer to a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method used to measure and/or identify domain configurations.

The term "block copolymer" refers to a polymer comprising two or more chemically distinct regions or segments (referred to as "blocks") joined to each other, that is, a polymer comprising chemically differentiated units which are joined (covalently bonded) to each other end-to-end with respect to polymerized functionality, or in pendent or grafted fashion. In an embodiment, the blocks differ in the amount or type of comonomer incorporated therein.

"Cable," and "power cable," and like terms refer to at least one wire or optical fiber within a sheath, e.g., an insulation covering or a protective outer jacket. Typically, a cable is two or more wires or optical fibers bound together, typically in a common insulation covering and/or a protective jacket. The individual wires or fibers inside the sheath may be bare, covered or insulated. Combination cables may contain both electrical wires and optical fibers. The cable can be designed for low, medium, and/or high voltage applications. Typical cable designs are illustrated in U.S. Pat. Nos. 5,246,783; 6,496,629 and 6,714,707.

The term "composition" refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "ethylene-based polymer," "ethylene polymer," or "polyethylene" is a polymer that contains equal to or greater than 50 wt %, or a majority amount of polymerized ethylene based on the weight of the polymer, and, optionally, may comprise one or more comonomers. The generic term "ethylene-based polymer" thus includes ethylene homopolymer and ethylene interpolymer. Suitable comonomers include, but are not limited to alpha-olefins, unsaturated esters, and combinations thereof.

A "jacket" is an outermost coating on the conductor.

An "olefin-based polymer" or "polyolefin" is a polymer that contains equal to or greater than 50 wt %, or a majority amount of polymerized olefin monomer (based on the weight of the polymer), and optionally, may contain at least one comonomer. Nonlimiting examples of α-olefin monomer include $C_2$, or $C_3$ to $C_4$, or $C_6$, or $C_8$, or $C_{10}$, or $C_{12}$, or $C_{16}$, or $C_{18}$, or $C_{20}$ α-olefins, such as ethylene, propylene, 1-butene, 1-hexene, 4-methyl-1-pentene, and 1-octene. Nonlimiting examples of an olefin-based polymer include an ethylene-based polymer and a propylene-based polymer.

A "polymer" is a polymeric compound prepared by polymerizing monomers, whether of the same or a different type. The generic term polymer thus embraces the term "homopolymer" (employed to refer to polymers prepared from only one type of monomer, with the understanding that trace amounts of impurities can be incorporated into the polymer structure), and the term "interpolymer," which includes copolymers (employed to refer to polymers prepared from two different types of monomers), terpolymers (employed to refer to polymers prepared from three different types of monomers), and polymers prepared from more than three different types of monomers. Trace amounts of impurities, for example, catalyst residues, may be incorporated into and/or within the polymer. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin comonomers. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer," "propylene polymer," or "polypropylene" is a polymer that contains equal to or greater than 50 wt %, or a majority amount of polymerized propylene based on the weight of the polymer, and, optionally, may comprise one or more comonomers. The generic term "propylene-based polymer" thus includes propylene homopolymer and propylene interpolymer.

A "sheath" is a generic term and when used in relation to cables, it includes insulation coverings or layers, protective jackets and the like.

A "wire" is a single strand of conductive metal, e.g., copper or aluminum, or a single strand of optical fiber.

Test Methods

Average particle size is measured on a LS 13 320 laser diffraction particle size analyzer using the Tornado Dry Powder particle size accessory from Beckman-Coulter Life Science. Volumetric mean particle size is measured. Particle size is measured in microns (μm).

Bulk density is measured in accordance with ASTM D4894. The result is reported in grams/liter (g/L).

Density is measured in accordance with ASTM D792, Method B. The result is recorded in grams (g) per cubic centimeter (g/cc or $g/cm^3$).

Drop point is determined according to ASTM D127. Drop point is measured using a ShenKai Drop Point Tester. Fluid samples are added to a vial with a hole at the bottom. The temperature of the vial is continuously increased until a first drop of fluid comes through the hole, said temperature being the drop point of the sample. The result is reported in degrees Celsius (° C.).

Dynamic viscosity is measured in accordance with ASTM D3236. Dynamic viscosity is measured using an AR2000EX equipped with a Peltier temperature controller and a 20 mm, 2 degree cone plate, set to a linear mode. Equilibrium is established at 25° C. for 2 minutes. Then, a steady state flow at a temperature of 25° C. is established for up to 2 minutes. Each sample is tested at a shear rate of 6/s, 50/s, and 200/s. Over a period of 10 seconds, 41 measurements are taken. The average is reported. The result is recorded in Pascal seconds (Pa·s).

Kinematic viscosity is measured at 40° C. in accordance with ASTM D445. The result is reported in Stokes (St) or centiStokes (cSt).

Melt index (MI) (also known as $I_2$) is measured in accordance with ASTM D1238, Condition 190° C./2.16 kilogram (kg) weight and is reported in grams eluted per 10 minutes (g/10 min).

Shear thinning index (SHI) is calculated in accordance with the method described in International Publication No. WO 2016/065497, incorporated herein by reference, using dynamic shear measurements of the flooding composition, and is defined as the ratio of the complex viscosity($\eta^*$) at two different shear stresses and is a measure of the broadness (or narrowness) of the molecular weight distribution. The measurements are performed on TA Instruments AR-G2 equipment equipped with a 25 mm parallel plate geometry at 190° C., a gap of 1.5 mm, and a frequency range of 0.01-500 $s^{-1}$. The SHI (2.7/210) is the ratio of the complex viscosity at 190° C. and a shear stress of 2.7 kPa ($\eta^*_{2.7kPa}$) and the complex viscosity at 190° C. and a shear stress of 210 kPa ($\eta^*_{210kpa}$). Here, the SHI reported is the ratio of viscosity at 6 1/s to the viscosity at 200 1/s, wherein viscosity is measured at room temperature (23° C.) using a Brookfield viscometer.

DETAILED DESCRIPTION

The present disclosure provides a flooding composition. The flooding composition includes, in weight percent (wt %) based on the weight of the composition, (A) from 1 wt % to less than 5 wt % of a polytetrafluoroethylene (PTFE) powder; (B) a styrene-ethylene/propylene block copolymer; and (C) a mineral oil having a kinematic viscosity from 32 cSt to 100 cSt at 40° C.

A. Polytetrafluoroethylene (PTFE) Powder

The present flooding composition includes a polytetrafluoroethylene (PTFE) powder. "Polytetrafluoroethylene" ("PTFE") is a synthetic fluoropolymer of tetrafluoroethylene containing a chain of carbon atoms with two fluorine atoms bonded to each carbon: —[$CF_2$—$CF_2$]—.

Nonlimiting examples of suitable PTFE powder include JF-4D, available from Zhejiang Jusheng Fluorochemistry Co., LTD.; Algoflon™ L100, Algoflon™ L203, and Algoflon™ L600, each available from Solvay Specialty Polymers; and ZONYLm MP 1600, available from DuPont.

The PTFE is a powder. The powder may include individual solid particles, agglomerates, or combinations thereof. In an embodiment, the PTFE is a powder with an average particle size from 0.01 µm, or 0.1 µm, or 0.2 µm, or 0.3 µm, or 0.4 µm, or 0.5 µm, or 1 µm, or 4 µm, or 5 µm, or 10 µm, or 20 µm, or 30 µm, or 40 µm, or 50 µm, or 100 µm, or 150 µm, or 200 µm, or 250 µm, or 300 µm, or 350 µm, or 400 µm, or 450 µm to 575 µm, or 600 µm, or 650 µm, or 700 µm, or 750 µm, or 800 µm. In an embodiment, PTFE is a powder with an average particle size from 100 µm to 800 µm, or from 200 µm to 700 µm, or from 300 µm to 600 µm, or from 500 µm to 600 µm.

In an embodiment, the PTFE powder includes individual solid particles. The individual solid particles have an average particle size from 0.01 µm, or 0.1 µm to 0.2 µm, or 0.3 µm, or 0.4 µm, or 0.5 µm.

In an embodiment, the PTFE powder includes agglomerates. The agglomerates have an average particle size from 100 µm, or 150 µm, or 200 µm, or 250 µm, or 300 µm, or 350 µm, or 400 µm, or 450 µm to 575 µm, or 600 µm, or 650 µm, or 700 µm, or 750 µm, or 800 µm. In an embodiment, the agglomerates have an average particle size from 100 µm to 800 µm, or from 200 µm to 700 µm, or from 300 µm to 600 µm, or from 500 µm to 600 µm.

In an embodiment, the PTFE powder has a bulk density from 300 g/L, or 325 g/L, or 350 g/L, or 375 g/L to 475 g/L, or 575 g/L, or 600 g/L, or 650 g/L.

In an embodiment, the PTFE powder has one or both of the following properties:

(i) an average particle size from 0.01 µm, or 0.1 µm, or 0.2 µm, or 0.3 µm, or 0.4 µm, or 0.5 µm, or 1 µm, or 4 µm, or 5 µm, or 10 µm, or 20 µm, or 30 µm, or 40 µm, or 50 µm, or 100 µm, or 150 µm, or 200 µm, or 250 µm, or 300 µm, or 350 µm, or 400 µm, or 4450 µm to 575 µm, or 600 µm, or 650 µm, or 700 µm, or 750 µm, or 800 µm; and/or (ii) a bulk density from 300 g/L, or 325 g/L, or 350 g/L, or 375 g/L to 475 g/L, or 575 g/L, or 600 g/L, or 650 g/L.

In an embodiment, the PTFE powder has one or both of the following properties:

(i) an average particle size from 300 µm, or 350 µm, or 400 µm, or 450 µm to 575 µm, or 600 µm, or 650 µm, or 700 µm; and/or (ii) a bulk density from 350 g/L, or 375 g/L to 475 g/L, or 575 g/L, or 600 g/L.

The polytetrafluoroethylene (PTFE) powder may comprise two or more embodiments disclosed herein.

B. Styrene-Ethylene/Propylene Block Copolymer

The present flooding composition includes a styrene-ethylene/propylene (SEP) block copolymer.

The SEP block copolymer is a di-block copolymer containing at least one styrene block and at least one ethylene/propylene block. In an embodiment, the SEP block copolymer consists of units derived from styrene, ethylene, and propylene. A nonlimiting example of a suitable SEP block copolymer is KRATON™ G1701 E, available from Kraton Corporation.

In an embodiment, the SEP block copolymer contains from 20 wt %, or 25 wt %, or 30 wt % to 35 wt %, or 40 wt %, or 45 wt %, or 50 wt % styrene, based on the total weight of the SEP block copolymer. In another embodiment, the SEP block copolymer contains from 20 wt % to 50 wt %, or from 25 wt % to 45 wt %, or from 30 wt % to 40 wt %, or from 30 wt % to 35 wt %, or from 35 wt % to 40 wt % styrene, based on the total weight of the SEP block copolymer.

In an embodiment, the SEP block copolymer has a density from 0.88 g/cc, or 0.89 g/cc, or 0.90 g/cc to 0.91 g/cc, or 0.92 g/cc, or 0.93 g/cc. In another embodiment, the SEP block copolymer has a density from 0.88 g/cc to 0.93 g/cc, or from 0.89 g/cc to 0.92 g/cc, or from 0.90 g/cc to 0.92 g/cc, or from 0.90 g/cc to 0.91 g/cc, or from 0.91 g/cc to 0.92 g/cc.

In an embodiment, the SEP block copolymer contains from 20 wt %, or 25 wt %, or 30 wt % to 35 wt %, or 40 wt %, or 45 wt %, or 50 wt % styrene, based on the total weight of the SEP block copolymer, and the SEP block copolymer has a density from 0.88 g/cc, or 0.89 g/cc, or 0.90 g/cc to 0.91 g/cc, or 0.92 g/cc, or 0.93 g/cc.

The SEP block copolymer may comprise two or more embodiments disclosed herein.

C. Mineral Oil

The present composition includes a mineral oil having a kinematic viscosity from 32 cSt to 100 cSt at 40° C.

Mineral oil contains higher alkanes from a mineral source, such as petroleum. A "higher alkane" is an acyclic saturated hydrocarbon molecule having at least 9 carbon atoms. A "hydrocarbon" is a compound containing only hydrogen and carbon atoms.

In an embodiment, the mineral oil includes a blend of higher alkanes and cycloalkanes. A "cycloalkane" is a monocyclic saturated hydrocarbon molecule. Nonlimiting examples of suitable cycloalkanes include cyclopropane, cyclobutane, cyclopentane, and cyclohexane.

Nonlimiting examples of suitable mineral oil include white oil, paraffin oil, liquid paraffin, and liquid petroleum. A nonlimiting example of a suitable commercial mineral oil is 400N mineral oil, available from Suzhou SAIPAHAN Special Oil Co. LTD.

Mineral oil is hydrophobic. The hydrophobic mineral oil enables the flooding composition to protect optical fibers from water in fiber optic cables.

The mineral oil has a kinematic viscosity at 40° C. from 32 cSt to 100 cSt. In an embodiment, the mineral oil has a kinematic viscosity at 40° C. from 32 cSt, or 40 cSt, or 50 cSt, or 60 cSt, or 65 cSt, or 70 cSt, or 75 cSt, or 80 cSt to 85 cSt, or 90 cSt, or 95 cSt, or 100 cSt. In a further embodiment, the mineral oil has a kinematic viscosity at 40° C. from 50 cSt to 100 cSt, or from 70 cSt to 100 cSt, or from 80 cSt to 100 cSt. Not wishing to be bound by any particular theory, it is believed that mineral oil having a kinematic viscosity at 40° C. of at least 32 cSt reduces oil migration into buffer tube materials in fiber optic cables. In contrast, mineral oil having a kinematic viscosity at 40° C. of less than 32 cSt contains low molecular weight oil-species that migrate into the buffer tube materials in fiber optic cables, which negatively impact the mechanical properties of the buffer tube and the fiber optic cable over time. Additionally, flooding compositions containing mineral oil having a kinematic viscosity at 40° C. of less than 32 cSt exhibit a viscosity that is too low for traditional flooding composition applications.

In an embodiment, the mineral oil has a kinematic viscosity at 40° C. of at least 32 cSt, or at least 35 cSt, or at least 40 cSt, or at least 45 cSt, or at least 50 cSt, or at least 55 cSt, or at least 60 cSt, or at least 65 cSt, or at least 70 cSt, or at least 75 cSt, or at least 80 cSt.

The mineral oil may comprise two or more embodiments disclosed herein.

D. Optional Additives

The present flooding composition may include one or more additives. Nonlimiting examples of suitable additives include antioxidants, rheology modifiers (e.g., thixotropic agents), thickening agents, stabilizers (e.g., UV stabilizers), mineral fillers, polymer fillers, and combinations thereof.

Antioxidants, when employed, can be present in any conventional amount, such as an amount ranging from 0.01 to 1 wt %, or from 0.01 to 0.3 wt %, based on the total weight of the flooding composition. Suitable antioxidants include, but are not limited to, hindered phenols such as tetrakis [methylene(3,5-di-tert-butyl-4-hydroxyhydrocinnamate)] methane; bis[(beta-(3,5-ditert-butyl-4-hydroxybenzyl)methylcarboxyethyl)]-sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)-hydrocinnamate; phosphites and phosphonites such as tris(2,4-di-tert-butylphenyl) phosphite and di-tert-butylphenyl-phosphonite; thio compounds such as dilaurylthiodipropionate, dimyristylthiodipropionate, and distearylthiodipropionate; various siloxanes; polymerized 2,2,4-trimethyl-1,2-dihydroquinoline, n,n'-bis(1,4-dimethylpentyl-p-phenylenediamine), alkylated diphenylamines, 4,4'-bis(alpha, alpha-dimethylbenzyl)diphenylamine, diphenyl-p-phenylenediamine, mixed di-aryl-p-phenylenediamines, and other hindered amine anti-degradants or stabilizers. In an embodiment, the antioxidant is tris(2,4-di-tert-butylphenyl) phosphite, commercially available as WESTCO™ AO-168 from Western Reserve Chemical.

Thixotropic agents, when employed, can be present in any conventional amount, such as an amount ranging from greater than 0 to 5 wt %, or 6 wt %, based on the total weight of the flooding composition. A nonlimiting example of a suitable thixotropic agent is fumed silica. Suitable commercial thixotropic agents include, but are not limited to, AEROSIL™ products from Evonik Corp. BYK Industries and Kusumoto Chemicals also supply suitable commercial thixotropic agents.

Nonlimiting examples of suitable thickening agent, when employed, include Kraton™ polymer such as styrene-butadiene-styrene (SBS) block copolymer, styrene-ethylene/butylene-styrene (SEBS) block copolymer. The thickening agent is compositionally and/or physically different than the SEP block copolymer.

Nonlimiting examples of mineral fillers, when employed, include inorganic mineral fillers such as silica, calcium carbonate, and combinations thereof.

In an embodiment, the flooding composition includes a polymeric filler. Nonlimiting examples of suitable polymeric fillers include polystyrene (e.g., low molecular weight polystyrene) and ethylene/propylene copolymer (e.g., having a weight average molecular weight, Mw, from 5,000 to 30,000 g/mol). Polymeric fillers, when employed, can be present in any conventional amount, such as an amount ranging from greater than 0 wt %, or 1 wt % to 10 wt %, based on the total weight of the flooding composition.

In an embodiment, the flooding composition can be free or substantially free of thixotropic agents. As used herein, the term "substantially free" shall mean a concentration of less than 10 parts per million by weight based on the total weight of the flooding composition.

In an embodiment, the flooding composition includes one or more fillers. Such fillers include, but are not limited to, hollow microspheres (e.g., glass or polymeric), mineral inorganic compounds, polymeric fillers, and the like. When employed, fillers can be present in any conventional amount, such as an amount ranging from greater than 0 wt % up to 60 wt %, based on the weight of the flooding composition.

The additive may comprise two or more embodiments disclosed herein.

E. Flooding Composition

The flooding composition is prepared by compounding (A) the PTFE powder, (B) the SEP block copolymer, (C) the mineral oil; and optionally, (D) the additive. For instance, (A) the PTFE powder, (B) the SEP block copolymer, (C) the mineral oil, and (D) any optional additives can be compounded in a liquid operational mixer with temperature control. For instance, the ingredients can be compounded in a batch or continuous mixer. Suitable batch mixers include, but are not limited to, Banbury™, Silverson™, Dynamix™ tank mixers and agitators, and Littleford™ batch mixers. Continuous mixers include twin and single-screw extruders, Farrel™ mixers, and Buss™ co-kneaders.

The flooding composition contains from 1 wt % to less than 5 wt % of the PTFE powder, based on the total weight of the composition. In an embodiment, the flooding composition contains from 1.0 wt %, or 2.0 wt % to 4.0 wt %, or 4.5 wt % PTFE powder, based on the total weight of the composition.

In an embodiment, the flooding composition contains from 5 wt %, or 6 wt % to 8 wt %, or 9 wt % SEP block copolymer, based on the total weight of the composition.

In an embodiment, the flooding composition includes from 70 wt %, or 75 wt %, or 80 wt %, or 85 wt %, or 88 wt % to 89 wt %, or 90 wt % mineral oil having a kinematic viscosity from 32 cSt to 100 cSt at 40° C., based on the total weight of the composition.

In an embodiment, the flooding composition is void of, or substantially void of, mineral oil having a kinematic viscosity at 40° C. of less than 32 cSt.

In an embodiment, the flooding composition is void of, or substantially void of, styrene-ethylene/butylene-styrene (SEBS) block copolymer.

In an embodiment, the flooding composition contains, consists essentially of, or consists of:
    (A) from 1 wt % to less than 5 wt % of the PTFE powder;
    (B) from 5 wt % to 9 wt % SEP block copolymer;
    (C) from 70 wt % to 90 wt % mineral oil having a kinematic viscosity from 32 cSt to 100 cSt at 40° C.; and
    (D) optionally, from 0.1 wt % to 10 wt % additive.
The aggregate of components (A)-(D) amount to 100 wt % of the flooding composition.

In an embodiment, the flooding composition contains, consists essentially of, or consists of:
    (A) from 1.0 wt %, or 2.0 wt % to 4.0 wt %, or 4.5 wt % PTFE powder;
    (B) from 5 wt %, or 6 wt % to 8 wt %, or 9 wt % SEP block copolymer;
    (C) from 70 wt %, or 75 wt %, or 80 wt %, or 85 wt %, or 88 wt % to 89 wt %, or 90 wt % mineral oil having a kinematic viscosity from 32 cSt to 100 cSt at 40° C.; and
    (D) optionally, from 0.1 wt %, or 0.5 wt % to 1 wt %, or 5 wt %, or 10 wt % additive. The aggregate of components (A)-(D) amount to 100 wt % of the flooding composition.

In an embodiment, the (A) PTFE powder, (B) SEP block copolymer, and (D) optional additive are dissolved, or substantially dissolved, in the (C) mineral oil.

In an embodiment, the flooding composition has a drop point from 195° C., or 200° C., or 201° C. to 213° C., or 215° C., or 220° C., or 225° C., or 230° C., or 240° C., or 250° C., or 260° C., or 270° C., or 280° C., or 290° C., or 300° C. In a further embodiment, the flooding composition has a drop point from 195° C. to 300° C., or from 195° C. to 250° C., or from 195° C. to 220° C., or from 200° C. to 215° C. Flooding compositions are conventionally extruded with an extrusion head temperature from 195° C. to 200° C., which is a temperature sufficient to melt the polymeric materials that form the buffer tube. Not wishing to be bound by any particular theory, it is believed that upon passing through an extrusion head with a temperature of 195-200° C., flooding compositions with a drop point of less than 195° C. will exhibit a significant decrease in viscosity and cannot be injected into, or fully filled into the buffer tube. To meet extrusion requirements, the drop point of the flooding composition should be at least 195° C.

In an embodiment, the flooding composition has a dynamic viscosity at 6/s from 14 Pa·s, or 15 Pa·s, or 16 Pa·s, or 17 Pa·s, or 18 Pa·s to 25 Pa·s, or 26 Pa·s, or 27 Pa·s, or 28 Pa·s, or 29 Pa·s, or 30 Pa·s. In a further embodiment, the flooding composition has a dynamic viscosity at 6/s from 14 Pa·s to 30 Pa·s, or from 15 Pa·s to 30 Pa·s, or from 18 Pa·s to 30 Pa·s, or from 18 Pa·s to 25 Pa·s. Not wishing to be bound by any particular theory, it is believed that, a flooding composition with a dynamic viscosity at 6/s of less than 14.0 Pa·s will result in too much mechanical stress being exerted on glass optical fibers, which causes signal attenuation.

In an embodiment, the flooding composition has a dynamic viscosity at 50/s from 3.0 Pa·s, or 4.0 Pa·s, or 5.0 Pa·s, or 5.5 Pa·s to 10 Pa·s, or 11 Pa·s.

In an embodiment, the flooding composition has a dynamic viscosity at 200/s from 1.5 Pa·s, or 2.0 Pa·s, or 2.5 Pa·s, or 3.0 Pa·s, or 3.5 Pa·s, or 4.0 Pa·s to 6.0 Pa·s, or 6.2 Pa·s, or 6.5 Pa·s, or 6.9 Pa·s, or less than 7.0 Pa·s. In a further embodiment, the flooding composition has a dynamic viscosity at 200/s from 1.5 Pa·s to less than 7.0 Pa·s, or from 1.5 Pa·s to 6.9 Pa·s, or from 2.0 Pa·s to 6.5 Pa·s, or from 4.0 Pa·s to 6.2 Pa·s. Flooding compositions are conventionally loaded into buffer tubes by pumping the flooding composition into the buffer tube at a high shear rate (e.g., 200/s). To meet pumping requirements at room temperature (about 25° C.), the dynamic viscosity at 200/s of the flooding composition should be less than 7.0 Pa·s.

In an embodiment, the flooding composition has a shear thinning index greater than 3.0, or greater than 3.5, or greater than 3.6. In another embodiment, the flooding composition has a shear thinning index from 3.0, or 3.5, or 3.6 to 4.2, or 4.5, or 5.0, or 10.0.

In an embodiment, the flooding composition has (i) a drop point from 195° C. to 300° C., or from 200° C. to 215° C.; and (ii) a dynamic viscosity at 200/s of from 1.5 Pa·s to less than 7.0 Pa·s, or from 4.0 Pa·s to 6.5 Pa·s.

In an embodiment, the flooding composition has (i) a drop point from 195° C. to 300° C., or from 200° C. to 215° C.; and (ii) a dynamic viscosity at 6/s of from 14 Pa·s to 30 Pa·s, or from 18 Pa·s to 25 Pa·s.

In an embodiment, the flooding composition has (i) a dynamic viscosity at 200/s of from 1.5 Pa·s to less than 7.0 Pa·s, or from 4.0 Pa·s to 6.5 Pa·s; and (ii) a dynamic viscosity at 6/s of from 14 Pa·s to 30 Pa·s, or from 18 Pa·s to 25 Pa·s.

In an embodiment, the flooding composition has (i) a drop point from 195° C. to 300° C., or from 200° C. to 215° C.; (ii) a dynamic viscosity at 200/s of from 1.5 Pa·s to less than 7.0 Pa·s, or from 4.0 Pa·s to 6.5 Pa·s; and (iii) a dynamic viscosity at 6/s of from 14 Pa·s to 30 Pa·s, or from 18 Pa·s to 25 Pa·s.

In an embodiment, the flooding composition has one, some, or all of the following properties:

(i) a drop point from 195° C., or 200° C., or 201° C. to 213° C., or 215° C., or 220° C., or 225° C., or 230° C., or 240° C., or 250° C., or 260° C., or 270° C., or 280° C., or 290° C., or 300° C.; and/or (ii) a dynamic viscosity at 6/s from 14 Pa·s, or 15 Pa·s, or 16 Pa·s, or 17 Pa·s, or 18 Pa·s to 25 Pa·s, or 26 Pa·s, or 27 Pa·s, or 28 Pa·s, or 29 Pa·s, or 30 Pa·s; and/or (iii) a dynamic viscosity at 50/s from 3.0 Pa·s, or 4.0 Pa·s, or 5.0 Pa·s, or 5.5 Pa·s to 10 Pa·s, or 11 Pa·s; and/or (iv) a dynamic viscosity at 200/s from 1.5 Pa·s, or 2.0 Pa·s, or 2.5 Pa·s, or 3.0 Pa·s, or 3.5 Pa·s, or 4.0 Pa·s to 6.0 Pa·s, or 6.2 Pa·s, or 6.5 Pa·s, or 6.9 Pa·s, or less than 7.0 Pa·s; and/or (v) a shear thinning index from 3.0, or 3.5, or 3.6 to 4.2, or 4.5, or 5.0, or 10.0.

In an embodiment, the flooding composition contains, consists essentially of, or consists of:

(A) from 1.0 wt %, or 2.0 wt % to 4.0 wt %, or 4.5 wt % PTFE powder having an average particle size from 100 μm, or 150 μm, or 200 μm, or 250 μm, or 300 μm, or 350 μm, or 400 μm, or 450 μm to 575 μm, or 600 μm, or 650 μm, or 700 μm, or 750 μm, or 800 μm;

(B) from 5 wt %, or 6 wt % to 8 wt %, or 9 wt % SEP block copolymer;

(C) from 70 wt %, or 75 wt %, or 80 wt %, or 85 wt %, or 88 wt % to 89 wt %, or 90 wt % mineral oil, the mineral oil having a kinematic viscosity at 40° C. from 32 cSt, or 40 cSt, or 50 cSt, or 60 cSt, or 65 cSt, or 70 cSt, or 75 cSt, or 80 cSt to 85 cSt, or 90 cSt, or 95 cSt, or 100 cSt;

(D) optionally, from 0.1 wt %, or 0.5 wt % to 1 wt %, or 5 wt %, or 10 wt % additive (such as an antioxidant); and the flooding composition has one, some, or all of the following properties:

(i) a drop point from 195° C., or 200° C., or 201° C. to 213° C., or 215° C., or 220° C., or 225° C., or 230° C., or 240° C., or 250° C.; and/or (ii) a dynamic viscosity at 6/s from 15 Pa·s, or 16 Pa·s, or 17 Pa·s, or 18 Pa·s to 25 Pa·s, or 26 Pa·s, or 27 Pa·s, or 28 Pa·s, or 29 Pa·s, or 30 Pa·s; and/or (iii) a dynamic viscosity at 50/s from 3.0 Pa·s, or 4.0 Pa·s, or 5.0 Pa·s, or 5.5 Pa·s to 10 Pa·s, or 11 Pa·s; and/or (iv) a dynamic viscosity at 200/s from 2.0 Pa·s, or 2.5 Pa·s, or 3.0 Pa·s, or 3.5 Pa·s, or 4.0 Pa·s to 6.0 Pa·s, or 6.2 Pa·s, or 6.5 Pa·s, or 6.9 Pa·s; and/or (v) a shear thinning index from 3.0, or 3.5, or 3.6 to 4.2, or 4.5, or 5.0; and/or (vi) the (A) PTFE powder, (B) SEP block copolymer, and (D) optional additive are dissolved, or substantially dissolved, in the (C) mineral oil; and/or (vii) the flooding composition is void of, or substantially void of, mineral oil having a kinematic viscosity at 40° C. of less than 32 cSt; and/or (viii) the flooding composition is void of, or substantially void of, SEBS block copolymer.

In an embodiment, the flooding composition contains, consists essentially of, or consists of:

(A) from 2 wt % to 4 wt % PTFE powder;

(B) from 6 wt % to 8 wt % SEP block copolymer;

(C) from 85 wt %, or 88 wt % to 89 wt %, or 90 wt % mineral oil, the mineral oil having a kinematic viscosity at 40° C. from 70 cSt, or 75 cSt, or 80 cSt to 85 cSt, or 90 cSt, or 95 cSt, or 100 cSt;

(D) optionally, from 0.1 wt %, or 0.5 wt % to 1 wt %, antioxidant; and the flooding composition has one, some, or all of the following properties:

(i) a drop point from 200° C., or 201° C. to 213° C., or 215° C.; and/or (ii) a dynamic viscosity at 6/s from 17 Pa·s, or 18 Pa·s to 25 Pa·s, or 30 Pa·s; and/or (iii) a dynamic viscosity at 50/s from 5.0 Pa·s, or 5.5 Pa·s to 10 Pa·s, or 11 Pa·s; and/or (iv) a dynamic viscosity at 200/s from 3.5 Pa·s, or 4.0 Pa·s to 6.0 Pa·s, or 6.2 Pa·s, or 6.5 Pa·s; and/or (v) a shear thinning index from 3.0, or 3.5, or 3.6 to 4.2, or 4.5, or 5.0; and/or (vi) the (A) PTFE powder, (B) SEP block copolymer, and (D) optional additive are dissolved, or substantially dissolved, in the (C) mineral oil; and/or (vii) the flooding composition is void of, or substantially void of, mineral oil having a kinematic viscosity at 40° C. of less than 32 cSt; and/or (viii) the flooding composition is void of, or substantially void of, SEBS block copolymer.

The flooding composition may comprise two or more embodiments disclosed herein.

F. Fiber Optic Cable

In an embodiment, a fiber optic cable, also known as an optical fiber cable, can be prepared that comprises at least one optical fiber, a plurality of buffer tubes, and the above-described flooding composition.

In an embodiment, a fiber optic cable is provided that contains a buffer tube, at least one optical fiber in the buffer tube; and a flooding composition. The flooding composition includes in weight percent (wt %) based on the weight of the composition: (A) from 1 wt % to less than 5 wt % PTFE powder; (B) a SEP block copolymer; (C) a mineral oil having a kinematic viscosity from 32 cSt to 100 cSt at 40° C.; and, optionally, (D) an additive.

The flooding composition may be any flooding composition disclosed herein.

Figure 1:
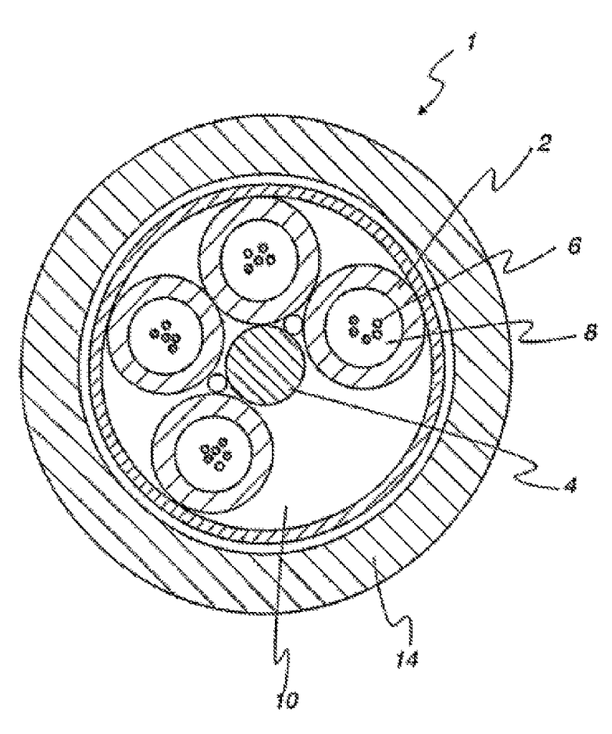
FIG. 1 is a cross-sectional view of a loose buffer tube fiber optical cable.

A cross-sectional view of a common loose-buffer-tube optical fiber cable is shown in FIG. 1. In this design of optical fiber cable 1, buffer tubes 2 are positioned radially around a central strength member 4, with a helical rotation to the tubes in the axial length. The helical rotation allows bending of the cable without significantly stretching the tube or the optic fibers 6.

If a reduced number of buffer tubes is required, then foamed filler rods can be used as low-cost spacers to occupy one or more empty buffer tube positions 10 to maintain cable geometry. The cable jacket 14 can generally be fabricated from a polyethylene-based material.

The above-described flooding composition can be used to fill the void spaces 8 surrounding optic fibers 6 within buffer tubes 2. Additionally, the flooding composition can be used to fill void spaces surrounding and between the buffer tubes 2, but within the cable jacket 14. The flooding composition provides the suspension and protection needed in the immediate environment surrounding the fibers, including eliminating air space. The flooding composition also provides a barrier against water penetration, which is detrimental to optic transmission performance.

Many other buffer tube cable designs are possible. The size and materials of construction for the central strength and tensile member, the dimensions and number of buffer tubes, and the use of metallic armors and multiple layers of jacketing material are among the design elements. Such designs that incorporate a flooding composition are contemplated within the scope of the present disclosure.

In an embodiment, the buffer tubes are formed from polypropylene copolymer (cPP) (such as ESCORENE™ 7132, an impact copolymer available from Exxon Chemical Company).

In an embodiment, the cable jacket is formed from a high density polyethylene (HDPE) (such as DGDA-6318BK, available from The Dow Chemical Company, having a density of 0.954 g/cm$^3$). A "high density polyethylene" (or "HDPE") is an ethylene-based polymer having a density of at least 0.94 g/cc, or from at least 0.94 g/cc to 0.98 g/cc.

An optical fiber cable, such as those described above, can typically be made in a series of sequential manufacturing steps. Optical transmission fibers are generally manufactured in the initial step. The fibers can have a polymeric coating for mechanical protection. These fibers can be assembled into bundles or ribbon cable configurations or can be directly incorporated into the cable fabrication.

Optical protective components can be manufactured using an extrusion fabrication process. Typically, a single screw plasticating extruder discharges a fluxed and mixed polymer under pressure into a wire and cable cross-head. The cross-head turns the melt flow perpendicular to the extruder and shapes the flow into the molten component. For buffer and core tubes, one or more optic fibers or fiber assemblies and flooding composition are fed into the back of the cross-head and exit the cross-head within the molten tube that is then cooled and solidified in a water trough system. This component is eventually collected as a finished component on a take-up reel.

To fabricate components made from two or more material layers, there typically would be separate plasticating extruders feeding the melt compositions into a multi-layer cross-head where it is shaped into the desired multi-layer construction.

Slotted core members and other profile extrusion components are typically extruded in a similar profile extrusion process incorporating an appropriate shaping die, and then subsequently combined with the optical fiber components to fabricate the finished cable.

To control excess fiber length, a tensioning system is used to feed the fiber components into the tube fabrication process. In addition, component materials selection, the tube extrusion and cross-head equipment, and processing conditions are optimized to provide a finished component where post extrusion shrinkage does not result in excessive slack in the optic fiber components.

The extruded optical protective components, along with other components such as central components, armors, wraps, are then subsequently processed in one or more steps to produce the finished cable construction. This typically includes processing on a cabling line where the components are assembled with a fabricating extruder/crosshead then used to apply the polymeric jacketing.

In an embodiment, the fiber optic cable 1 contains, consists essentially of, or consists of:

a buffer tube 2;

at least one optical fiber 6 in the buffer tube 2; and a flooding composition containing, consisting essentially of, or consisting of:

(A) from 1.0 wt %, or 2.0 wt % to 4.0 wt %, or 4.5 wt % PTFE powder having an average particle size from 0.01 μm, or 0.1 μm, or 0.2 μm, or 0.3 μm, or 0.4 μm, or 0.5 μm, or 1 μm, or 4 μm, or 5 μm, or 10 μm, or 20 μm, or 30 μm, or 40 μm, or 50 μm, or 100 μm, or 150 μm, or 200 μm, or 250 μm, or 300 μm, or 350 μm, or 400 μm, or 450 μm to 575 μm, or 600 μm, or 650 μm, or 700 μm, or 750 μm, or 800 μm;

(B) from 5 wt %, or 6 wt % to 8 wt %, or 9 wt % SEP block copolymer;

(C) from 70 wt %, or 75 wt %, or 80 wt %, or 85 wt %, or 88 wt % to 89 wt %, or 90 wt % mineral oil, the mineral oil having a kinematic viscosity at 40° C. from 32 cSt, or 40 cSt, or 50 cSt, or 60 cSt, or 65 cSt, or 70 cSt, or 75 cSt, or 80 cSt to 85 cSt, or 90 cSt, or 95 cSt, or 100 cSt;

(D) optionally, from 0.1 wt %, or 0.5 wt % to 1 wt %, or 5 wt %, or 10 wt % additive (such as an antioxidant); and the flooding composition has one, some, or all of the following properties:

(i) a drop point from 195° C., or 200° C., or 201° C. to 213° C., or 215° C., or 220° C., or 225° C., or 230° C., or 240° C., or 250° C., or 260° C., or 270° C., or 280° C., or 290° C., or 300° C.; and/or (ii) a dynamic viscosity at 6/s from 14 Pa·s, or 15 Pa·s, or 16 Pa·s, or 17 Pa·s, or 18 Pa·s to 25 Pa·s, or 26 Pa·s, or 27 Pa·s, or 28 Pa·s, or 29 Pa·s, or 30 Pa·s; and/or (iii) a dynamic viscosity at 50/s from 3.0 Pa·s, or 4.0 Pa·s, or 5.0 Pa·s, or 5.5 Pa·s to 10 Pa·s, or 11 Pa·s; and/or (iv) a dynamic viscosity at 200/s from 1.5 Pa·s, or 2.0 Pa·s, or 2.5 Pa·s, or 3.0 Pa·s, or 3.5 Pa·s, or 4.0 Pa·s to 6.0 Pa·s, or 6.2 Pa·s, or 6.5 Pa·s, or 6.9 Pa·s, or less than 7.0 Pa·s; and/or (v) a shear thinning index from 3.0, or 3.5, or 3.6 to 4.2, or 4.5, or 5.0; and/or (vi) the (A) PTFE powder, (B) SEP block copolymer, and (D) optional additive are dissolved, or substantially dissolved, in the (C) mineral oil, and In an embodiment, the fiber optic cable 1 contains, consists essentially of, or consists of:

a buffer tube 2;

at least one optical fiber 6 in the buffer tube 2; and a flooding composition containing, consisting essentially of, or consisting of:

(A) from 2 wt % to 4 wt % PTFE powder;

(B) from 6 wt % to 8 wt % SEP block copolymer;

(C) from 85 wt %, or 88 wt % to 89 wt %, or 90 wt % mineral oil, the mineral oil having a kinematic viscosity at 40° C. from 70 cSt, or 75 cSt, or 80 cSt to 85 cSt, or 90 cSt, or 95 cSt, or 100 cSt;

(D) optionally, from 0.1 wt %, or 0.5 wt % to 1 wt %, antioxidant; and the flooding composition has one, some, or all of the following properties:

(i) a drop point from 200° C., or 201° C. to 213° C., or 215° C.; and/or (ii) a dynamic viscosity at 6/s from 17 Pa·s, or 18 Pa·s to 25 Pa·s, or 30 Pa·s; and/or (iii) a dynamic viscosity at 50/s from 5.0 Pa·s, or 5.5 Pa·s to 10 Pa·s, or 11 Pa·s; and/or (iv) a dynamic viscosity at 200/s from 3.5 Pa·s, or 4.0 Pa·s to 6.0 Pa·s, or 6.2 Pa·s, or 6.5 Pa·s; and/or (v) a shear thinning index from 3.0, or 3.5, or 3.6 to 4.2, or 4.5, or 5.0; and/or (vi) the (A) PTFE powder, (B) SEP block copolymer, and (D) optional additive are dissolved, or substantially dissolved, in the (C) mineral oil; and/or (vii) the flooding composition is void of, or substantially void of, mineral oil having a kinematic viscosity at 40° C. of less than 32 cSt; and/or (viii) the flooding composition is void of, or substantially void of, SEBS block copolymer.

Bounded by no particular theory, it is believed that including (A) from 1 wt % to less than 5 wt % PTFE powder into a flooding composition containing (B) SEP block copolymer and (C) mineral oil having a kinematic viscosity from 32 cSt to 100 cSt at 40° C. results in the flooding composition exhibiting an advantageous combination of the following properties: (i) a drop point from 195° C. to 300° C., (ii) a dynamic viscosity at 200/s of from 1.5 Pa·s to less than 7.0 Pa·s, and (iii) a dynamic viscosity at 6/s of from 14 Pa·s to 30 Pa·s. Flooding compositions exhibiting the combination of (i) a drop point from 195° C. to 300° C., (ii) a dynamic viscosity at 200/s of from 1.5 Pa·s to less than 7.0 Pa·s, and (iii) a dynamic viscosity at 6/s of from 14 Pa·s to 30 Pa·s are suitable for fiber optic cable applications.

In an embodiment, the flooding composition is in the buffer tube, filling the void spaces surrounding the optical fiber.

In an embodiment, the fiber optic cable includes a jacket surrounding the buffer tubes, and the flooding composition fills the void spaces surrounding and between the buffer tubes, but within the jacket.

In an embodiment, the flooding composition is in the buffer tube, filling the void spaces surrounding the optical fiber, and the flooding composition fills the void spaces surrounding and between the buffer tubes, but within the jacket.

The fiber optic cable may comprise two or more embodiments disclosed herein.

Byway of example, and not limitation, some embodiments of the present disclosure will now be described in detail in the following Examples.

EXAMPLES

The materials used in the examples are provided in Table 1 below.

TABLE 1

| Materials | | |
|---|---|---|
| Component | Specification | Source |
| JF-4D | polytetrafluoroethylene (PTFE) powder average particle size = 575 μm bulk density = 475 ± 100 g/L | Zhejiang Jusheng Fluorochemistry Co., LTD. |
| KRATON ™ G1701 E | styrene-ethylene/propylene (SEP) linear copolymer 35 wt % styrene[1] density = 0.91 g/cc | Kraton |
| 400N Mineral Oil | mineral oil kinematic viscosity at 40° C. = 80 cSt | Suzhou SAIPAHAN Special Oil Co. LTD. |
| WESTCO ™ AO-168 | antioxidant tris(2,4-di-tert-butylphenyl)phosphite white powder | Western Reserve Chemical |

[1]Based on the weight of the SEP block copolymer.

A. Sample Preparation

The (A) PTFE powder (JF-4D), (A) SEP block copolymer (KRATON™ G1701 E), (C) mineral oil having a kinematic viscosity of 80 cSt at 40° C. (400N Mineral Oil), and (D) antioxidant (WESTCO™ AO-168) are loaded into a 1 liter glass reactor, equipped with an oil bath heater, a mechanical stir bar, a nitrogen injection, and a vacuum outlet. Nitrogen gas is slowly injected (at a rate of less than 1 liter per minute), and the flooding composition is heated to 120° C., followed by stirring at 60 rotations per minute (rpm) for 30 minutes to dissolve the PTFE powder, SEP block copolymer, and antioxidant into the mineral oil. Then, the oil bath temperature is set to 155° C. and the stirring speed is set to 200 rpm for a period of 90 minutes, after which the oil bath heater is shut down to allow the flooding composition to cool. Once the flooding composition reaches a temperature below 80° C., the flooding composition is transferred from the glass reactor to a glass bottle for performance evaluation. The total weight of each sample is 150 grams (g).

The composition and properties of each flooding composition is provided in Table 2 below.

TABLE 2*

|  | CS 1 | CS 2 | CS 3 | CS 4 | Ex 1 | Ex 2 | Ex 3 | CS 5 |
|---|---|---|---|---|---|---|---|---|
| JF-4D (PTFE powder) | — | — | — | — | 2 | 3 | 4 | 5 |
| KRATON ™ G1701 E (SEP) | 5 | 6 | 8 | 10 | 8 | 7 | 6 | 5 |
| 400N Mineral Oil | 94 | 93 | 91 | 89 | 89 | 89 | 89 | 89 |
| WESTCO ™ AO-168 | 1 | 1 | 1 | 1 | 1 | 1 | 1 | 1 |
| Total wt % | 100 | 100 | 100 | 100 | 100 | 100 | 100 | 100 |
| Dynamic Viscosity at 6/s (Pa·s) | 7.03 | 7.68 | 14.10 | 52.90 | 24.60 | 21.50 | 18.20 | 13.10 |
| Dynamic Viscosity at 50/s (Pa·s) | 2.82 | 3.75 | 7.97 | 18.6 | 9.99 | 7.58 | 5.54 | 4.18 |
| Dynamic Viscosity at 200/s (Pa·s) | 2.51 | 3.58 | 7.00 | 8.90 | 6.13 | 5.96 | 4.42 | 3.15 |
| Shear Thinning Index | 2.80 | 2.15 | 2.01 | 5.94 | 4.01 | 3.61 | 4.12 | 4.16 |
| Drop Point (° C.) | 99.4 | 198.3 | 212.0 | 232.7 | 212.5 | 207.2 | 201.0 | 190.4 |

CS = Comparative Sample
*Amounts are in weight percent (wt %), based on the total weight of the flooding composition.

B. Results

CS 1 and CS 2 are comparative flooding compositions that lack PTFE powder. CS 1 and CS 2 each contain 5-6 wt % of a SEP block copolymer (KRATON™ G1701 E), a mineral oil with a kinematic viscosity of 80 cSt at 40° C. (400N Mineral Oil), and an antioxidant (WESTCO™ AO-168). CS 1 and CS 2 each exhibit a dynamic viscosity at 6/s of less than 14.0 Pa·s (specifically, 7.03 Pa·s and 7.68 Pa·s), which is too low for fiber optic cable applications because a dynamic viscosity at 6/s of less than 14.0 Pa·s will result in too much mechanical stress being exerted on glass optical fibers, which causes signal attenuation in fiber optic cables.

CS 3 and CS 4 are comparative flooding compositions that lack PTFE powder. CS 3 and CS 4 each contain 8-10 wt % of a SEP block copolymer (KRATON™ G1701 E), a mineral oil with a kinematic viscosity of 80 cSt at 40° C. (400N Mineral Oil), and an antioxidant (WESTCO™ AO-168). CS 3 and CS 4 each exhibit a dynamic viscosity at 200/s of 7.0 Pa·s or more (specifically, 7.00 Pa·s and 8.90 Pa·s), which is too high for fiber optic cable applications. Flooding compositions are conventionally loaded into buffertubes by pumping the flooding composition into the buffer tube at a high shear rate (e.g., 200/s). To meet pumping requirements at room temperature (about 25° C.), the dynamic viscosity at 200/s of the flooding composition should be less than 7.0 Pa·s.

CS 5 is a comparative flooding composition containing (A) 5 wt % PTFE powder (JF-4D), (B) a SEP block copolymer (KRATON™ G1701 E), (C) a mineral oil with a kinematic viscosity of 80 cSt at 40° C. (400N Mineral Oil), and (D) an antioxidant (WESTCO™ AO-168). CS 5 exhibits a drop point of less than 195° C. (specifically, 190.4° C.), which is too low for fiber optic cable applications. Flooding compositions are conventionally extruded with an extrusion head temperature from 195° C. to 200° C., which is a temperature sufficient to melt the polymeric materials that form the buffer tube. Upon passing through an extrusion head with a temperature of 195-200° C., flooding compositions that have a drop point of less than 195° C. exhibit a significant decrease in viscosity and cannot be injected into, or fully filled into the buffer tube. To meet extrusion requirements, the drop point of the flooding composition should be at least 195° C.

Applicant unexpectedly found that flooding compositions containing (A) from 1 wt % to less than 5 wt % PTFE powder (JF-4D), (B) a SEP block copolymer (KRATON™ G1701 E), (C) a mineral oil with a kinematic viscosity of 80 cSt at 40° C. (400N Mineral Oil), and (D) an antioxidant (WESTCO™ AO-168) (Ex. 1-3) exhibit the desirable combination of (i) a dynamic viscosity at 6/s of at least 14.0 Pa·s, (ii) a dynamic viscosity at 200/s of less than 7.0 Pa·s, and (iii) a drop point of at least 195° C. Consequently, flooding composition samples Ex. 1-3 are suitable for fiber optic cable applications.

C. SEBS Block Copolymer Comparative Samples

Comparative Samples are also prepared in accordance with the above procedures, but with a styrene-ethylene/butylene-styrene (SEBS) block copolymer instead of a SEP block copolymer.

Applicant unexpectedly found that the SEBS block copolymer was difficult to, or could not be, dissolved in the mineral oil after the flooding composition is heated to 120° C. Consequently, the comparative samples containing SEBS block copolymer (instead of the SEP block copolymer) are not suitable for fiber optic cable applications.

It is specifically intended that the present disclosure not be limited to the embodiments and illustrations contained herein, but include modified forms of those embodiments including portions of the embodiments and combinations of elements of different embodiments as come within the scope of the following claims.

We claim:

1. A flooding composition comprising in weight percent (wt %) based on the weight of the composition:
    (A) from 1 wt % to less than 5 wt % of a polytetrafluoroethylene (PTFE) powder;
    (B) a styrene-ethylene/propylene block copolymer; and
    (C) a mineral oil having a kinematic viscosity from 32 cSt to 100 cSt at 40° C.

2. The flooding composition of claim 1 comprising:
    (A) from 1 wt % to less than 5 wt % PTFE powder;

(B) from 5 wt % to 9 wt % styrene-ethylene/propylene block copolymer; and (C) from 70 wt % to 90 wt % mineral oil.

3. The flooding composition of claim 2, wherein the flooding composition has a drop point from 195° C. to 300° C.

4. The flooding composition of claim 2, wherein the flooding composition has a dynamic viscosity at 200/s from 1.5 Pa·s to less than 7.0 Pa·s.

5. The flooding composition of claim 4, wherein the flooding composition has a dynamic viscosity at 6/s from 14 Pa·s to 30 Pa·s.

6. The flooding composition of claim 2, wherein the flooding composition has
   (i) a drop point from 195° C. to 300° C.;
   (ii) a dynamic viscosity at 6/s from 14 Pa·s to 30 Pa·s; and
   (iii) a dynamic viscosity at 200/s from 1.5 Pa·s to less than 7.0 Pa·s.

7. The flooding composition of claim 1, wherein the PTFE powder has an average particle size from 0.01 μm to 800 μm.

8. A fiber optic cable comprising:
   a buffer tube;
   at least one optical fiber in the buffer tube; and
   the flooding composition of claim 1.

9. The fiber optic cable of claim 8 wherein the flooding composition has a drop point from 195° C. to 300° C. and a dynamic viscosity at 200/s from 1.5 Pa·s to less than 7.0 Pa·s.

10. The fiber optic cable of claim 9 wherein the PTFE powder has an average particle size from 0.01 μm to 800 μm.

* * * * *